United States Patent
Rivero et al.

(10) Patent No.: US 6,184,796 B1
(45) Date of Patent: *Feb. 6, 2001

(54) METHOD AND APPARATUS FOR AUTOMATIC TELEPHONE DIALING FROM A PAGER MESSAGE

(75) Inventors: Jose L. Rivero; Brent Beatty; Bryon K. Tiller, all of Boca Raton; David J. Allard; Francis J. Canova, Jr., both of Boynton Beach; Neal A. Osborn, Delray Beach, all of FL (US)

(73) Assignee: Pacific Communication Sciences, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/587,717

(22) Filed: Jan. 19, 1996

(51) Int. Cl.$^7$ .................................................... H04B 7/00
(52) U.S. Cl. ......................... 340/825.44; 379/57; 379/40; 379/156; 455/38.1
(58) Field of Search ................... 340/825.44, 825.48, 340/825.69, 825.72, 825.8, 825.79; 379/57, 40, 156, 157

(56) References Cited

U.S. PATENT DOCUMENTS

| | | | |
|---|---|---|---|
| 4,490,579 | * 12/1984 | Godoshian | 379/57 |
| 4,817,135 | * 3/1989 | Winebaum | 375/355 |
| 4,951,039 | * 8/1990 | Schwendeman et al. | 340/725 |
| 4,976,182 | * 12/1990 | Obuchi et al. | 84/462 |
| 4,977,399 | * 12/1990 | Price et al. | 340/825.44 |
| 5,054,051 | * 10/1991 | Hoff | 379/56 |
| 5,099,507 | * 3/1992 | Mukai et al. | 379/57 |
| 5,280,516 | * 1/1994 | Jang | 379/57 |
| 5,335,276 | * 8/1994 | Thompson et al. | 380/21 |
| 5,430,436 | * 7/1995 | Fennell | 340/825.44 |
| 5,459,773 | * 10/1995 | Hwang | 379/57 |
| 5,542,115 | * 7/1996 | Wong et al. | 455/53.1 |
| 5,559,862 | * 9/1996 | Bhagat et al. | 379/58 |
| 5,734,981 | * 3/1998 | Kennedy, III et al. | 455/445 |
| 5,822,402 | * 10/1998 | Marszalek | 379/67 |

* cited by examiner

*Primary Examiner*—Michael Horabik
*Assistant Examiner*—Anthony A. Asongwed
(74) *Attorney, Agent, or Firm*—Blakely, Sokoloff, Taylor & Zafman, LLP

(57) ABSTRACT

A personal communication device which includes the ability to generate dual tone multi-frequency (DTMF) signals to provide automatic telephone dialing of a numbers received in messages. A message which includes a number is received, decoded, and displayed on a display device. The user may then select to have a number which is included as part of the message encoded into an audible DTMF, series of signals which can be coupled to a conventional "touch-tone" telephone (i.e. a telephone that supports tone dialing) through speaker in the personal communication device and the microphone of the conventional telephone. The user may select all or any part of the message to be encoded into DTMF signals. Accordingly, if the message includes other information in addition to a telephone number, the user can parse the message to indicate which portion of the message includes the number to be dialed. In an alternative embodiment of the present invention, a processor within the personal communication device parses the message to detect numbers from among the information that has been transmitted. The user may then verify that the processor has properly identified numbers which the user wishes to encode in DTMF signals.

30 Claims, 2 Drawing Sheets

METHOD AND APPARATUS FOR AUTOMATIC TELEPHONE DIALING FROM A PAGER MESSAGE

BACKGROUND OF THE INVENTION

1. Field of the Invention

This invention relates to personal communication systems, and more particularly to a personal communication device having the capability to generate dual tone multi-frequency signals to automatically dial a conventional telephone in response to a received message.

2. Description of Related Art

As communication technology continues to improve and frequencies are allocated for use by personal communication systems, the use of such personal communication systems has been growing rapidly. For example, it is common today to see a person carrying a personal pager which receives messages over a radio air link. Such messages typically communicate to the person carrying the pager a numeric sequence which has been keyed in by a caller through a telephone keypad after the caller dials a telephone number that has been uniquely assigned to that particular pager. This numeric sequence typically will include a telephone number which can be dialed to contact the caller. Once the message is received, the person carrying the pager may go to a telephone and dial the number which is indicated in the message in order to contact the caller.

Such pages are inconvenient because the person responding to the page message must read the telephone number from the pager display and manually dial the number. Therefore, the responding person must either perform the cumbersome task of simultaneously holding the pager and the telephone handset while dialing, or read the telephone number, put down the pager, remember the number, and dial. As is always the case when a person attempts to dial a telephone number, there is the possibility that the number will be dialed incorrectly either due to the person making an error in reading the number, remembering the number incorrectly between the time the number is read and the time the number is dialed, or making a mechanical error in the dialing process.

Accordingly, it would be desirable to provide a method and apparatus which allows a personal communication device to interface directly with a conventional telephone to automatically dial a number which has been received as part of a message. The present invention provides such a method and apparatus.

SUMMARY OF THE INVENTION

The present invention is a personal communication device which includes a means for generating dual tone multi-frequency (DTMF) signals which interfaces with a receiver, processing device, and display to provide automatic telephone dialing of numbers received as a message or as part of a message.

In the preferred embodiment of the present invention a message which includes numbers is received and decoded. The message is then displayed on a display device. Typically, the personal communication device will signal the user either before displaying the message or after displaying the message to indicate to the user that a message has been received. The indication may be either audible or silent. In either case, once the message has been displayed, the user may select to have a number which is included as part of the message encoded into an audible DTMF series of signals which can be coupled to a conventional "touch-tone" telephone (i.e., a telephone that supports tone dialing) through speaker in the personal communication device and the microphone of the conventional telephone.

In accordance with one embodiment of the present invention, the user may select all or any part of the message to be encoded into DTMF signals. Accordingly, if the message includes other information in addition to a telephone number, the user can parse the message to indicate which portion of the message includes the numbers to be encoded into DTMF signals. In an alternative embodiment of the present invention, a processor within the personal communication device parses the message to detect numbers from among the information that has been transmitted. The user may then verify that the processor has properly identified the numbers which the user wishes to encode from among the other information included within the message. In yet another embodiment, the user selects the first digit of a number, such as a telephone number or personal identification number (PIN), embedded within the message and encodes in DTMF signals each of the digits starting from the digit selected. In accordance with this embodiment, if the number selected is a telephone number and there are additional digits which are not part of the telephone number, the call will be completed by the telephone and the additional DTMF signals will be ignored.

In an alternative embodiment of the present invention, the user can edit the messages to correct the information received, or enter new additional numbers to be encoded into DTMF signals.

In yet another alternative embodiment, the user may associated a particular sequence of characters with a particular sequence of numbers, such that when that sequence of characters is selected from within a received message, DTMF signals corresponding to the associated sequence of numbers are generated.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

The present invention is a method and apparatus which enables a personal communication device to receive a message and automatically generate such dual tone multi-frequency (DTMF) signals as are used to dial a conventional "touch-tone" telephone. When the received message includes numbers, the present invention is capable of generating a DTMF signal associated with each number. Preferably, the signal associated with a number is the same signal that is generated when that number is dialed on a conventional touch-tone telephone keypad. In an alternative embodiment of the present invention, particular alphabetic characters may be assigned to DTMF signals, such that messages received with those characters will cause the personal communication device to generate a particular pattern of DTMF signals. In one embodiment of the present invention, there need not be a one-to-one correspondence between the number of signals that are generated and the number of characters that cause those signals to be generated. For example, the message "PIN" may be used to cause a sequence of DTMF signals which correspond to a personal identification number to be generated. The relationship between the sequence of characters and the sequence of DTMF signals generated may be programmed by the user.

Figure 1:
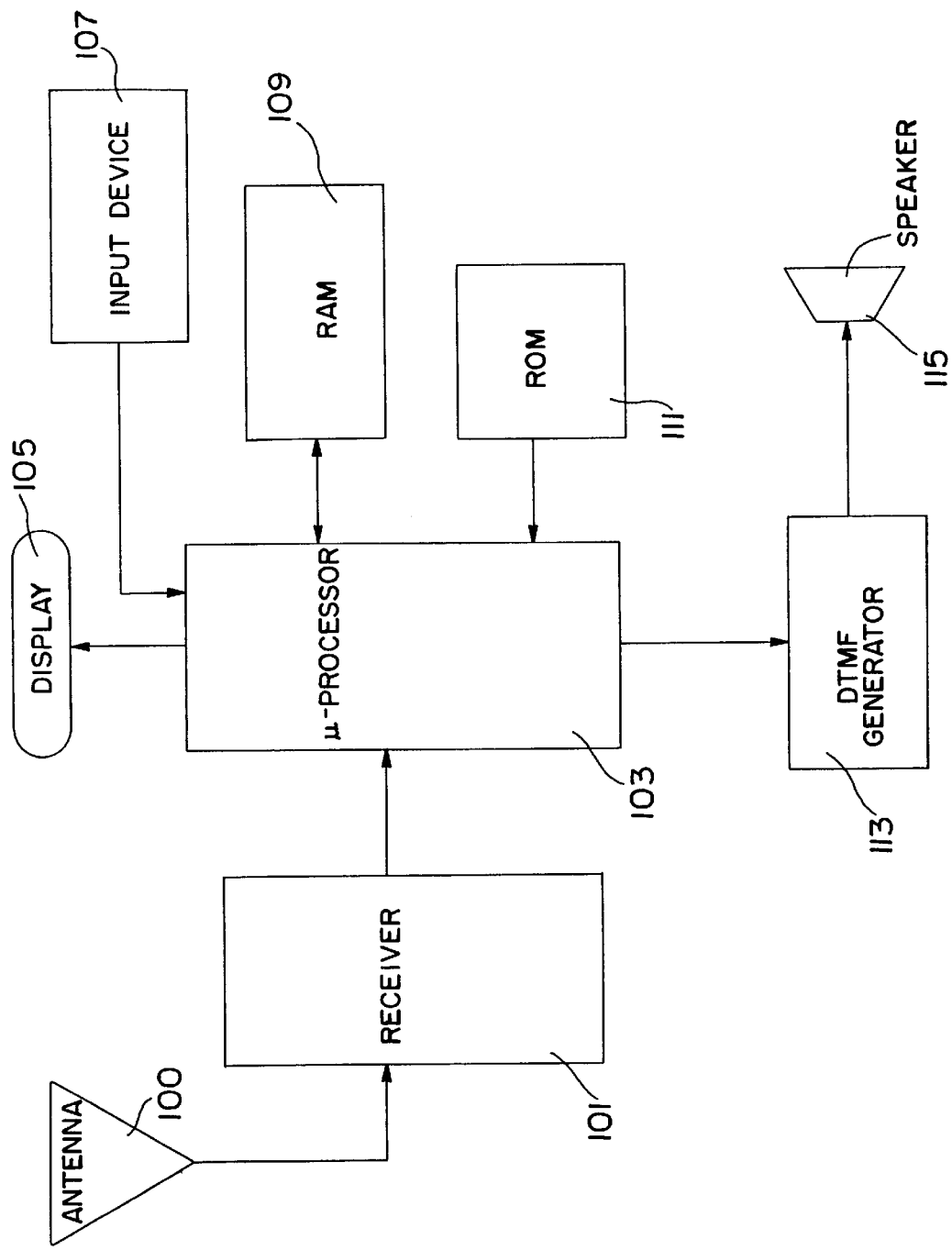
FIG. 1 is a block diagram of a personal communication in accordance with the present invention.

FIG. 1 is a block diagram of a personal communication device in accordance with the present invention. In the embodiment of the present invention shown in FIG. 1, the personal communication device is a pager which preferably includes: an antenna 100, a conventional receiver 101, a processing device 103, an output device, such as a visual display device 105, an input device 107, a random access memory (RAM) device 109, a read-only memory (ROM) device 111, a dual tone multi-frequency (DTMF) generator 113, and a speaker 115. The processing device 103 may be any device which is capable of performing logical functions (i.e. respond to an input or series of inputs in a predetermined way), such as a programmable microprocessor, a state machine, an application specific integrated circuit (ASIC), or discrete logic which is designed to perform logical functions. It will be understood by those skilled in the art that in the case in which the processing device is not a programmable device, the ROM device 111 may not be required. In accordance with one embodiment of the present invention the display device 105 is a conventional flat panel display which is capable of displaying 3 message lines and 3 additional lines. The display may be any flat panel display, such as an emissive display (e.g., electroluminescence, Plasma vaccum fluorescent, field emissio, or light emitting diode) or a non-emissive (e.g., liquid crystal active or passive matrix). The 3 additional lines are used to interface with and prompt, the user. In addition, the display device is preferably capable of displaying a cursor or pointer which allows the user to identify a particular message or character within a message, as will be discussed in greater detail below. In an alternative embodiment of the present invention, the display may be any output device which is capable of presenting the characters which comprise a message that has been received. For example, in one alternative embodiment, the output device is an audio output having voice synthesis. Such an output device presents the characters in a synthesized human voice. In yet another alternative embodiment, the present invention has no output device.

The input device 107 may be any device such as a keypad, touchscreen, or push buttons, which allows the user to interface with the processing device 103 in order to provide commands and responses to the processing device 103. In accordance with the present invention, the DTMF signals may be generated by a DTMF generator, such as shown in FIG. 1. However, in an alternative embodiment of the present invention, the DTMF signals may be generated by the processing device 103, by a pair of tunable oscillators, or any other circuit that is capable of generating a signal which is a composite of two audio frequency tones.

In accordance with the present invention, messages are received by the pager through the antenna 100. The message is demodulated and decoded by the receiver 101. The receiver preferably includes a conventional demodulator and digital signal processor (DSP) which decodes the message and provides a digital data stream to the processing device 103. However, any means for receiving and decoding the message may be used. Messages coupled from the receiver 101 to the processing device 103 are preferably stored in the RAM 109. However, in an alternative embodiment of the present invention, messages may be stored directly within the processing device, rather than within a discrete RAM. Each of the messages that are stored in the RAM 109 may be coupled to the display 105 for viewing by the user. In one embodiment of the present invention, the user is prompted to request display of one or more messages when a new message is received. Alternatively, received messages are displayed without any input from the user. In the case in which the processing device is a programmable microprocessor, as is the case with the pacer shown in FIG. 1, the program which is executed by the microprocessor 103 is stored in the ROM 111.

Upon displaying one or more of the messages, the user may select one of the messages to be coupled to the DTMF generator 113. In the preferred embodiment of the present invention, the user directs a cursor to point to a telephone number, or other sequence of characters, contained within a message.

In one embodiment of the present invention, the user may edit the message to insert additional characters or correct errors in the characters that are present in the message. These characters are then directly coupled by the processing device 103 to the DTMF generator 113. The DTMF generator 113 generates a DTMF signal associated with each digit for a sufficiently long time that each digit within the sequence activates a DTMF signal recognition circuit within a convention telephone system. The DTMF signals thus generated are coupled to the speaker 115 which produces sound at the frequencies output from the DTMF generator 113. The sound produced from the speaker 115 is sufficiently loud to activate the DTMF signal recognition circuits within a conventional telephone when the user places the pager in close proximity to a microphone of a conventional telephone. Thus, the pager automatically dials the number sequence which the user selects from the display. In an alternative embodiment of the present invention, DTMF signals are generated directly by the processing device 103. These signals may be generated as square wave output signals which are filtered to generate appropriate DTMF signals.

In an alternative embodiment of the present invention, the selected characters may be mapped to an arbitrary DTMF signal sequence by the processing device 103. In accordance with this embodiment, the processing device 103 couples a numeric sequence that will cause the DTMF generator 113 to generate the appropriate sequence of signals to the DTMF generator 113. For example, the user may map the character sequence "PIN" to the numeric sequence 1, 3, 2, 4, 5, 8, and 9. Therefore, when the user selects the characters "PIN" from a received message, the processing device couples the numeric sequence 1, 3, 2, 4, 5, 8, and 9 to the DTMF generator 113, which produces the DTMF sequence which would be produced by pressing the numbers 1, 3, 2, 4, 5, 8, and 9 sequentially on a telephone keypad. In accordance with this embodiment, the user maps a character sequence to a numeric sequence which represents a DTMF signal sequence using the input device to first enter the character sequence followed by a control character (such as a dedicated button) to mark the end of the character sequence, and then a numeric sequence followed by another control character to mark the end of the numeric sequence.

In another alternative embodiment, the user may associate a particular procedure or sequence of DTMF tones with an icon which can be selected from the display. For example, by selecting an icon, the user instructs the processing device 103 to identify a telephone number from within a message on the display, generate a predetermined sequence of DTMF tones required to select a particular carrier to be used for placing a call to the selected telephone number, and then generate the tones required to indicate the users credit card number. The amount of time and proper sequence in which these tones are generated is programmed into the processing device 103 to properly complete the call. Accordingly, the user need only select the icon from the display and a call to the telephone number within the message being displayed will be placed through the selected carrier indicated by the icon and using the user's credit card. Any intervals between generating tones required during the dialing procedure can be inserted by the processing device 103.

In one alternative embodiment of the present invention, no output device is provided. Received messages are stored and DTMF tone may be generated which correspond to numeric characters received as part of the message upon the user activating the appropriate controls on the invention. While this embodiment does not allow the user to determine the nature of the message before generating DTMF tones in response to the message, the reduction in size, power requirements, and expense of such an embodiment may be significant.

Figure 2:
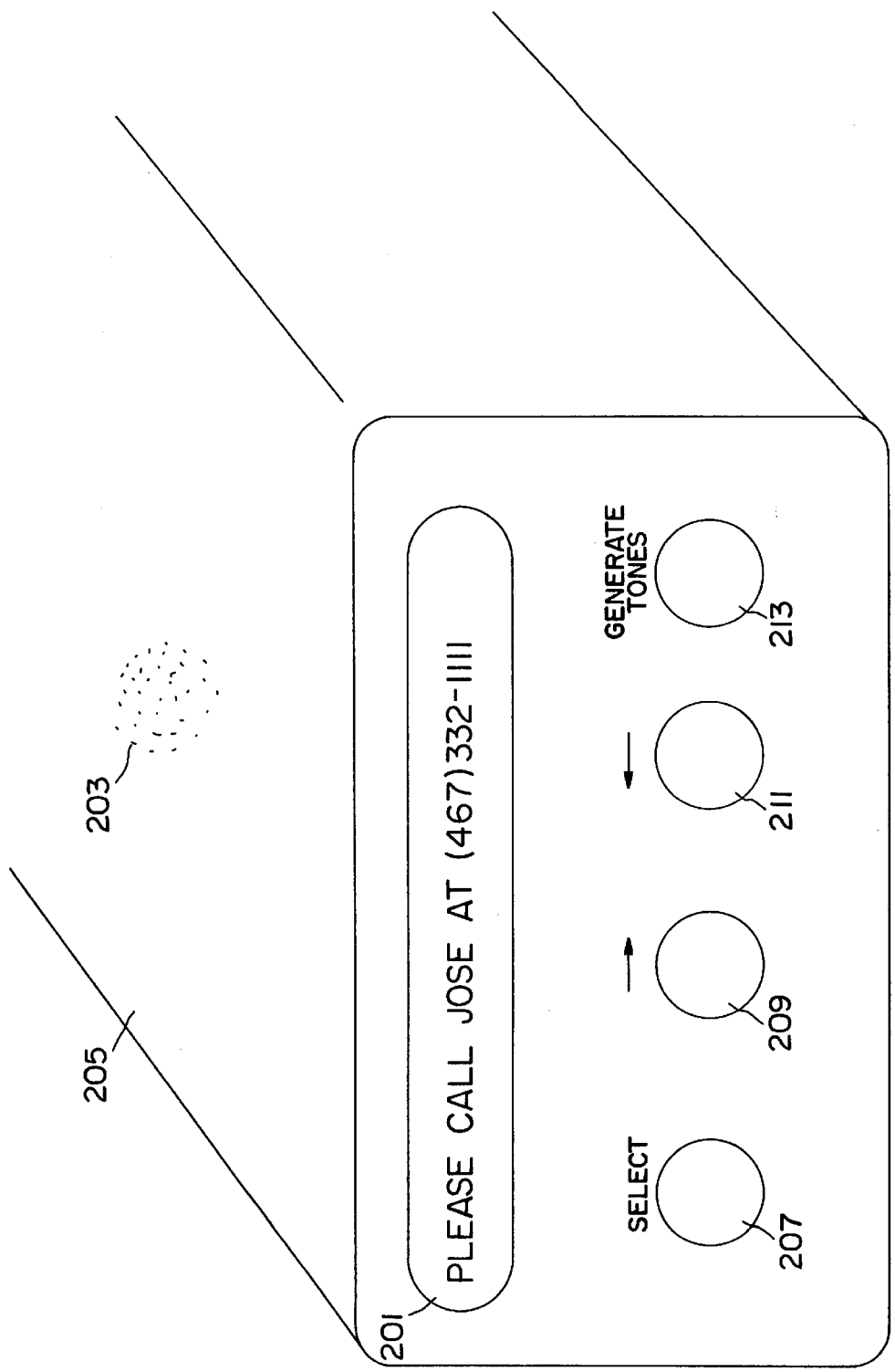
FIG. 2 is an illustration of the front panel of a pager in accordance with the present invention.

FIG. 2 is an illustration of one embodiment of the present invention in which a display 201 is provided as the output device. A speaker is mounted under a perforated section 203 of the output casing 205. Four buttons 207, 209, 211, 213 are provided to allow the user to operate the device. The first such button 207 allows the user to cycle through the messages, and select options, such as whether DTMF tones are to be generated which select a particular carrier prior to placing a call to a telephone number which is included within the displayed message. The second button 209 allows the user to specifically identify a telephone number from within a message by moving a cursor to the right across the display 201. Likewise, the third button 211 allows the user to move the cursor across the display to the left. The fourth button allows the user to initiate the generation of DTMF tones which correspond to the telephone number which has been selected (either automatically or manually) from the displayed message.

There are a number of methods which may be used for selecting the characters from the display in accordance with the present invention. For example, characters may be selected by the user to determine the DTMF signals by activating a select key and an arrow key. As each character is selected, that character is highlighted in reverse video. More specifically, in one embodiment, the user positions the cursor before the first digit to be coupled to the DTMF generator 113, presses and holds the select key, and using the arrow key, moves the cursor across the characters to be coupled to the DTMF generator 113. As the cursor moves over each character, the characters are highlighted (such as in reverse video) to indicate that they have been selected. Once each of the characters has been selected, the user releases the select key, causing the selected characters to be either directly coupled to the DTMF generator 113, or to be processed by the processing device in order to determine the particular sequence of DTMF signals that correspond to that sequence of characters.

In an alternative embodiment, the user positions a cursor before the first character to be encoded, presses and releases the select button, and moves the cursor past the last character to be encoded. The user then presses the select button again, and each of the characters between the first and last character are encoded into DTMF signals. In accordance with another alternative embodiment, the user simply selects a message by moving the cursor to any point within the message. All of the characters within the selected message are then used to determine the DTMF signal sequence to be generated. In accordance with yet another embodiment of the present invention, only one message is displayed at a time. The particular message that is displayed can then be selected to determine the sequence of DTMF signals to be generated. Pressing a first button causes the display to cycle through each of the messages currently available. Pressing a second button selects the message currently being displayed, and causes DTMF signals associated with the displayed message to be generated. In yet another alternative embodiment in which a touchscreen is used as the input device, the user simply presses the portion of the touchscreen at which the desired characters are displayed.

In another alternative embodiment of the present invention, the processing device parses the message in an attempt to identify a character sequence within the message which is associated with a sequence of DTMF signals. The characters which the processing device identifies are highlighted, such as by displaying these numbers in reverse video. If the processing device has selected a desired sequence, the user accepts the selection and the sequence is used to determine the sequence of DTMF signals to be generated. If the processing device has not identified a desired sequence, then the user may correct the selection manually.

Summary

The present invention relieves the user of the need to make the choice as to whether to put the pager down and remember the number displayed while dialing, or dial the number while holding both the telephone handset and the pager in order to read the number from the display while dialing.

A number of embodiments of the present invention have been described. Nevertheless, it will be understood that various modifications may be made without departing from the spirit and scope of the invention. For example, a number of methods may be used to select the particular numbers which are to be used to generate DTMF signals. Furthermore, while the present invention is described as using a programmable processor having both RAM and ROM, the present invention may be implemented with a dedicated circuit which controls the display and couples the received information to the DTMF generator upon request from the user. Furthermore, while the present invention is described in the context of a wireless pager, this invention may be used in any personal communication apparatus which has the ability to receive and display messages which contain numbers. Accordingly, it is to be understood that the invention is not to be limited by the specific illustrated embodiment, but only by the scope of the appended claims.

What is claimed is:

1. A portable personal communication device for receiving messages over a radio air link, the messages including a numeric sequence representing a telephone number which can be dialed by the portable personal communication device to initiate a telephone call, the portable personal communication device comprising:

a radio receiver to receive messages over a radio air link;

a processor coupled to the radio receiver, the processor to automatically parse a received message to automatically identify a numeric sequence as a telephone number;

a DTMF generator, the DTMF generator to generate a sequence of DTMF signals in response to the processor automatically identifying a numeric sequence as a telephone number within a received message; and a loudspeaker coupled to the DTMF generator, the loudspeaker to receive a generated sequence of DTMF signals from the DTMF generator and generate a sequence of audible tonal sounds in response thereto, the generated sequence of audible tonal sounds including audible tonal sounds to dial a telephone number into a microphone of a telephone to initiate a telephone call.

2. The portable personal communication device of claim 1 further comprising:

a display device coupled to the processor to display a received message and first and second user selectable icons, the first user selectable icons being associated with operation of the portable personal communication device and the second user selectable icons being associated with instructing the processor to identify a telephone number within a displayed received message.

3. The portable personal communication device of claim 2 wherein, one of the first user selectable icons displayed on the display device to select a carrier from one or more available carriers for use in placing a call to a selected telephone number using a user's credit card number, and the processor to generate DTMF signals to select the particular carrier and to represent the user's credit card number and the selected telephone number in response to the selection of the one of the first user selectable icons.

4. The portable personal communication device of claim 2 wherein, the portable personal communication device is a pager and the pager to acoustically couple audible tonal sounds into a microphone of an external telephone.

5. The portable personal communication device of claim 2 wherein, the portable personal communication device is a cellular telephone with a message receive capability and the cellular telephone further comprises a microphone coupled to the DTMF generator to receive the generated sequence of DTMF signals to dial a telephone number to initiate a telephone call.

6. The portable personal communication device of claim 2 wherein, the DTMF generator is part of the processor.

7. The portable personal communication device of claim 1 further comprising:

a speech synthesis output device coupled to the processor to communicate information within a received message to a user.

8. The portable personal communication device of claim 7 further comprising:

a speech recognizer input device coupled to the processor to receive audible speech commands from a user for operation of the portable personal communication device.

9. The portable personal communication device of claim 8, wherein, the audible speech commands from a user include selection of a telephone number from a received message for communication to the processor.

10. A portable personal communication device for receiving messages over a radio air link, the received messages including a numeric sequence representing a telephone number which can be dialed by the portable communication device to initiate a telephone call, the portable personal communication device comprising:

a radio receiver to receive messages over a radio air link;

a processor coupled to the radio receiver, the processor to control the functionality of the portable personal communication device and to process the received messages and to allow a user to select a numeric sequence as a telephone number within a received message;

a display device coupled to the processor to display a received message and a user directable cursor to select a numeric sequence as a telephone number within a received message;

an input device coupled to the processor, the input device to receive user inputs directing the user directable cursor over the numeric sequence displayed by the display device to select a telephone number within a received message and to communicate to the processor received user inputs, including the selection of a numeric sequence as a telephone number within a received message;

a DTMF generator, the DTMF generator to generate a sequence of DTMF signals in response to the selection of a numeric sequence associated with a telephone number within a received message; and a loudspeaker coupled to the DTMF generator, the loudspeaker to receive a generated sequence of DTMF signals from the DTMF generator and to generate a sequence of audible tones in response thereto, the generated sequence of audible tones for coupling into a microphone of a telephone to initiate a telephone call.

11. The portable personal communication device of claim 10 wherein, the portable personal communication device is a pager and the pager to acoustically couple audible tonal sounds into a microphone of an external telephone.

12. The portable personal communication device of claim 10 wherein, the portable personal communication device is a cellular telephone with a message receive capability and the cellular telephone further comprises a microphone coupled to the DTMF generator to receive the generated sequence of DTMF signals to dial a telephone number to initiate a telephone call.

13. The portable personal communication device of claim 10 wherein, the DTMF generator is is part of the processor.

14. The portable personal communication device of claim 10 wherein, the display device coupled to the processor further displays user selectable icons, a first set of the user selectable icons being associated with operational procedures of the portable personal communication device and a second set of user selectable icons being associated with instructing the processor to identify a telephone number within a displayed received message.

15. A personal communication device for receiving messages over a radio air link, the messages including a numeric sequence representing a telephone number which can be dialed to call a sender of a received message, the personal communication device comprising:

a receiver for receiving messages over a radio air link;

a processor coupled to the receiver, the processor to control the personal communication device and to process received messages and allow a user to select a numeric sequence associated with a telephone number within a received message;

a display device coupled to the processor to display a received message and a user directable cursor to select a telephone number within a received message, the display device further displays user selectable icons, the user selectable icons being associated with operational procedures or a sequence of DTMF signals for instructing the processor to identify a telephone number within a displayed received message, wherein one of the user selectable icons displayed on the display device selects a particular carrier for use in placing a call to a selected telephone number using a user's credit card number and the processor generates DTMF signals to select the particular carrier and represent the user's credit card number and the selected telephone number;

an input device coupled to the processor, the input device to receive user inputs to direct the user directable cursor to select a telephone number within a received message and to communicate received user inputs to the processor, including the selection of a telephone number within a received message;

a DTMF generator, the DTMF generator to generate a sequence of DTMF signals in response to the selection of a numeric sequence associated with a telephone number within a received message; and a speaker coupled to the DTMF generator, the speaker to receive a generated sequence of DTMF signals from the DTMF generator and generate a sequence of audible tones in response thereto, the generated sequence of audible tones for coupling into a microphone of a telephone.

16. The personal communication device of claim 15 wherein, the personal communication device is a pager and the pager acoustically couples the audible tones into a microphone of an external telephone.

17. The personal communication device of claim 15 wherein, the personal communication device is a cellular telephone with a message receive capability and the cellular telephone further comprises a microphone coupled to the DTMF generator to receive the generated sequence of DTMF signals to dial a telephone number to initiate a telephone call.

18. The personal communication device of claim 15 wherein, the DTMF generator is part of the processor.

19. A portable personal communication device for receiving messages over a radio air link, the messages including a numeric sequence representing a telephone number which can be dialed by the portable personal communication device to initiate a telephone call, the portable personal communication device comprising:

a radio receiver to receive messages over a radio air link;

a processor coupled to the radio receiver, the processor to control operation of the portable personal communication device and to process received messages and to allow a user to select a numeric sequence as a telephone number within a received message;

a speech synthesis output device coupled to the processor to audibly communicate information to a user using audible speech to enable a user to select a telephone number within a received message;

a speech recognizer input device coupled to the processor, the speech recognizer input device to receive and recognize audible speech user inputs including audible speech commands to select a numeric sequence as a telephone number within a received message and to communicate to the processor received user inputs, including the selection of numeric sequence as a telephone number within a received message;

a DTMF generator, the DTMF generator to generate a sequence of DTMF signals in response to the selection of a numeric sequence as a telephone number within a received message; and a loudspeaker coupled to the DTMF generator, the loudspeaker to receive a generated sequence of DTMF signals from the DTMF generator and to generate a sequence of audible tonal sounds in response thereto, the generated sequence of audible tonal sounds for coupling into a microphone of a telephone to initiate a telephone call.

20. The portable personal communication device of claim 19, wherein, the speech synthesis output device further communicates information of the received messages to select a received message.

21. The portable personal communication device of claim 19, wherein, the audible speech commands from a user include selection of a telephone number from a received message for communication to the processor.

22. A method of automatic acoustical dialing of a telephone number for coupling into a telephone to dial a telephone number, the method comprising:

a) providing a portable personal communication device for receiving messages over a radio air link, the portable personal communication device including, a radio receiver to receive messages over a radio air link, a processor coupled to the radio receiver, the processor to automatically parse a received message to automatically identify a numeric sequence as a a telephone number, a DTMF generator, the DTMF generator to generate a sequence of DTMF signals in response to the processor automatically identifying a numeric sequence as a telephone number within a received message, and a loudspeaker coupled to the DTMF generator, the loudspeaker to receive a generated sequence of DTMF signals from the DTMF generator and generate a sequence of audible tonal sounds in response thereto, the generated sequence of audible tonal sounds including audible tonal sounds to dial a telephone number into a microphone of a telephone to initiate a telephone call;

b) receiving a message in the portable personal communication device;

c) automatically parsing a received message in the processor to automatically identify a numeric sequence as a telephone number in the received message;

d) generating DTMF signals in the DTMF generator in response to the automatic parsing of the received message identifying a numeric sequence as a telephone number; and e) generating audible tonal sounds in response to the generated DTMF signals, the audible tonal sounds for acoustical coupling to a microphone to dial a telephone number in order to initiate a telephone call.

23. The method of claim 22 for automatic acoustical dialing of a telephone number for coupling into a telephone to dial a telephone number, the method further comprising:

f) selecting one of a plurality of received messages for automatic parsing by the processor using an input device included in the portable personal communication device in order to automatically generate audible tonal sounds associated with a telephone number within a selected received message.

24. The method of claim 22 for automatic acoustical dialing of a telephone number for coupling into a telephone to dial a telephone number, the method further comprising:

f) correcting an error in the automatic parsing by the processor prior to storage of the telephone number into a memory of the portable personal communication device.

25. A method of automatic acoustical dialing of a telephone number for coupling into a telephone to dial a telephone number, the method comprising:

a) providing a portable personal communication device for receiving messages over a radio air link, the portable personal communication device including,
  a radio receiver to receive messages over a radio air link;
  a processor coupled to the radio receiver, the processor to control the functionality of the portable personal communication device and to process received messages and to allow a user to select a numeric sequence as a telephone number within a received message;
  a display device coupled to the processor to display a received message and a user directable cursor to select a numeric sequence as a telephone number within a received message;
  an input device coupled to the processor, the input device to receive user inputs directing the user directable cursor over the numeric sequence displayed on the display device to select a telephone number within a received message and to communicate to the processor received user inputs, including the selection of a numeric sequence as a telephone number within a received message;
  a DTMF generator, the DTMF generator to generate a sequence of DTMF signals in response to the selection of a numeric sequence associated with a telephone number within a received message; and
  a loudspeaker coupled to the DTMF generator, the loudspeaker to receive a generated sequence of DTMF signals from the DTMF generator and generate a sequence of audible tonal sounds in response thereto, the generated sequence of audible tonal sounds for coupling into a microphone of a telephone to initiate a telephone call;

b) receiving a message in the portable personal communication device;

c) moving the user directable cursor by use of the input device to select a numeric sequence associated with a telephone number within the received message displayed on the display;

d) generating DTMF signals in the DTMF generator in response to the selection of the numeric sequence in the received message; and e) generating audible tonal sounds for coupling to a microphone in response to the generated DTMF signals.

26. The method of claim 25 for automatic acoustical dialing of a telephone number for coupling into a telephone to dial a telephone number, wherein, in the moving of the user directable cursor, the numeric sequence associated with the telephone number is selected within the received message displayed on the display by selecting each individual number of a telephone number.

27. The method of claim 25 for automatic acoustical dialing of a telephone number for coupling into a telephone to dial a telephone number, wherein, in the moving of the user directable cursor, the numeric sequence associated with the telephone number is selected within the received message displayed on the display by selecting the first number of the telephone number and the processor automatically selects the remaining numbers of the telephone number.

28. The method of claim 25 for automatic acoustical dialing of a telephone number for coupling into a telephone to dial a telephone number, wherein, in the moving of the user directable cursor, the numeric sequence associated with the telephone number is selected within the received message displayed on the display by selecting a user selectable icon on the display associated with a telephone number and the processor automatically selects the telephone number associated with the user selectable icon to which to initiate a telephone call.

29. The method of claim 25 for automatic acoustical dialing of a telephone number for coupling into a telephone to dial a telephone number, further comprising:

selecting a first user selectable icon on the display to select a telephone carrier to use in placing a telephone call and to generate DTMF signals associated with the selected telephone carrier.

30. The method of claim 29 for automatic acoustical dialing of a telephone number for coupling into a telephone to dial a telephone number, further comprising:

selecting a second user selectable icon on the display to select a telephone number to use in placing the telephone call and to generate DTMF signals associated with the selected telephone number.

* * * * *